Oct. 25, 1960 M. STEINMAN 2,957,259
CYCLICALLY CHANGEABLE DISPLAY DEVICE
Filed April 10, 1958 4 Sheets-Sheet 1
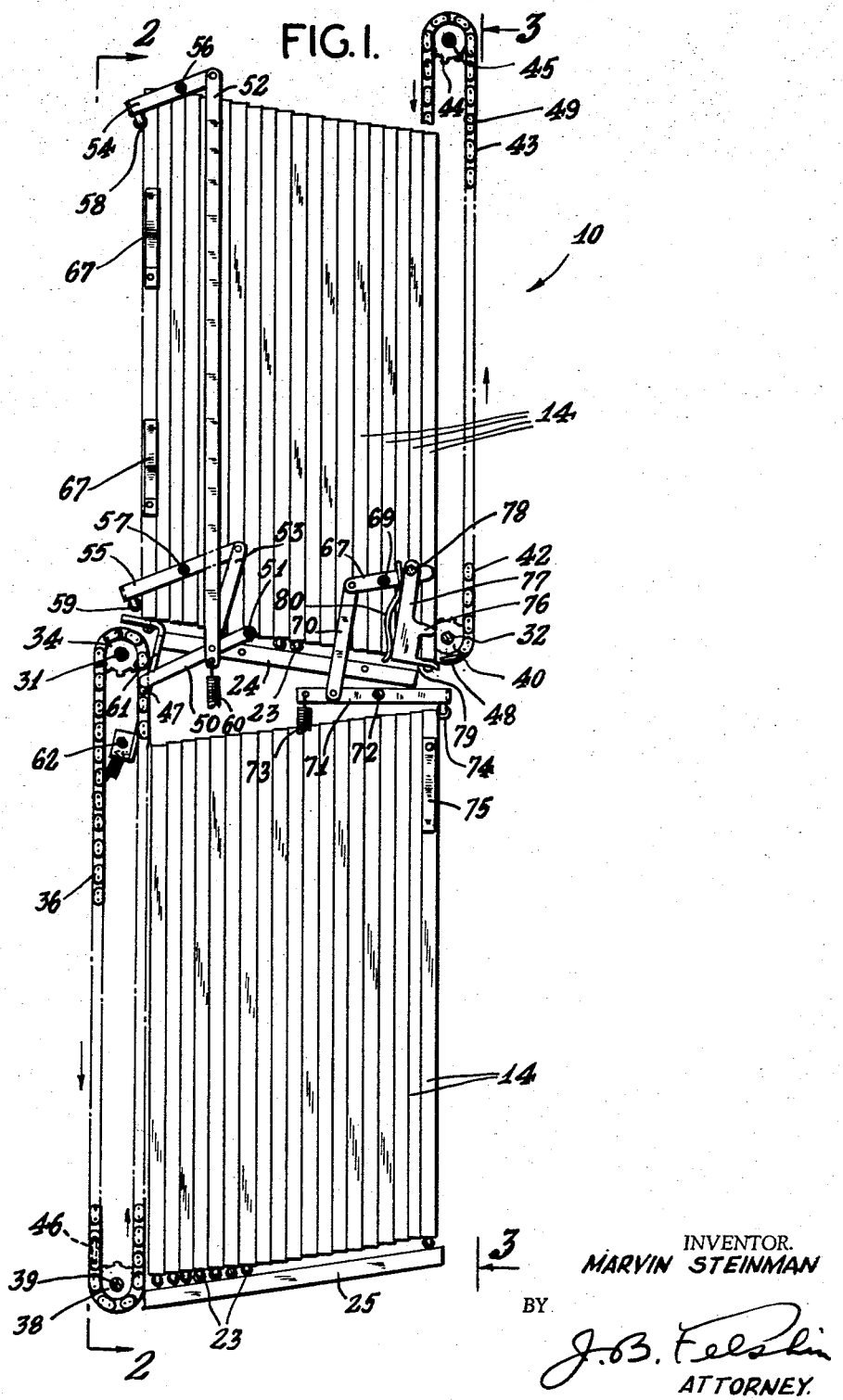
FIG. I.
INVENTOR.
MARVIN STEINMAN
BY
J.B. Felshin
ATTORNEY.

Oct. 25, 1960
M. STEINMAN
2,957,259
CYCLICALLY CHANGEABLE DISPLAY DEVICE
Filed April 10, 1958
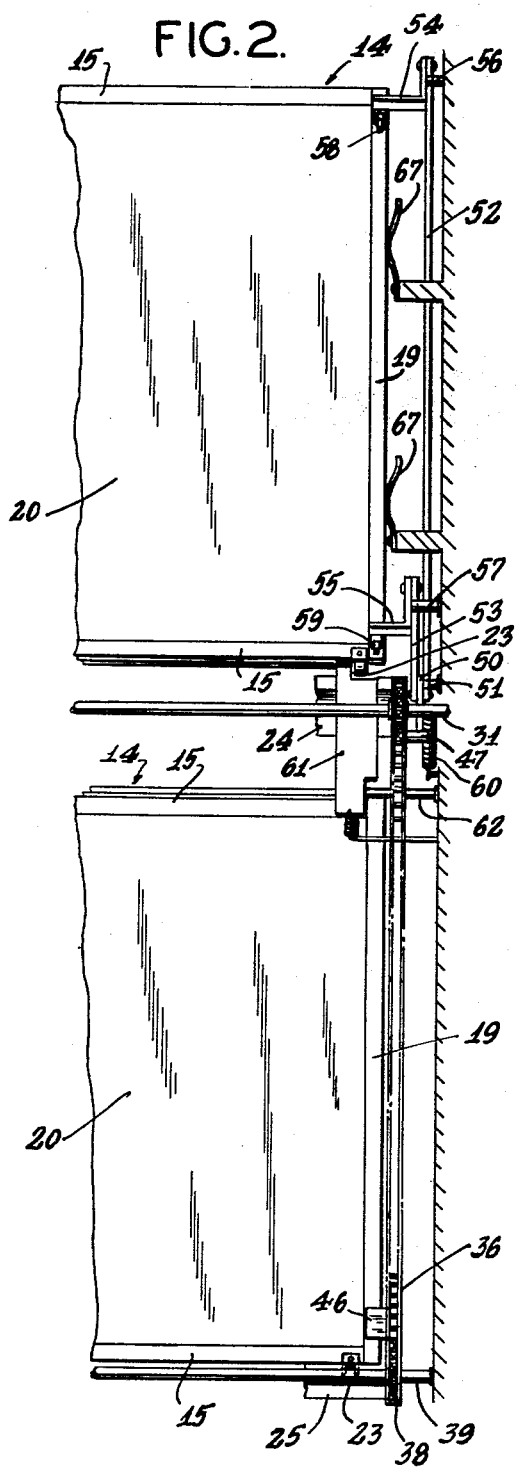
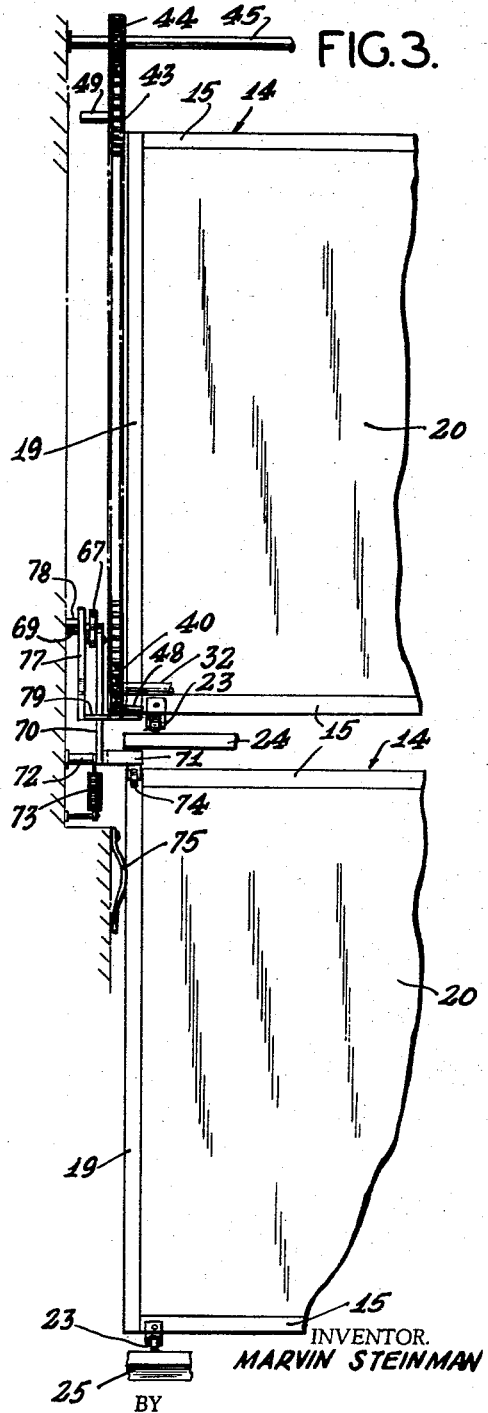
INVENTOR.
MARVIN STEINMAN
BY
J. B. Felshin
ATTORNEY.

Oct. 25, 1960 M. STEINMAN 2,957,259
CYCLICALLY CHANGEABLE DISPLAY DEVICE
Filed April 10, 1958 4 Sheets-Sheet 3

INVENTOR.
MARVIN STEINMAN
BY
J.B. Felshin
ATTORNEY.

Oct. 25, 1960  M. STEINMAN  2,957,259
CYCLICALLY CHANGEABLE DISPLAY DEVICE
Filed April 10, 1958  4 Sheets-Sheet 4
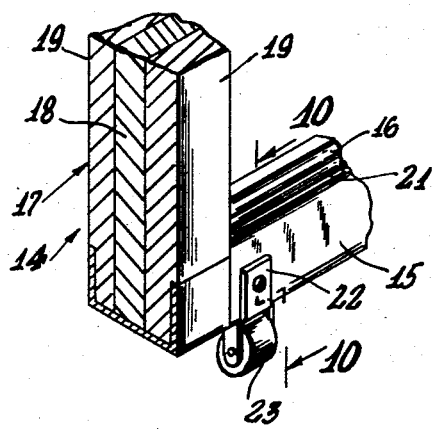
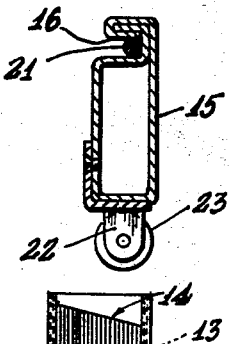
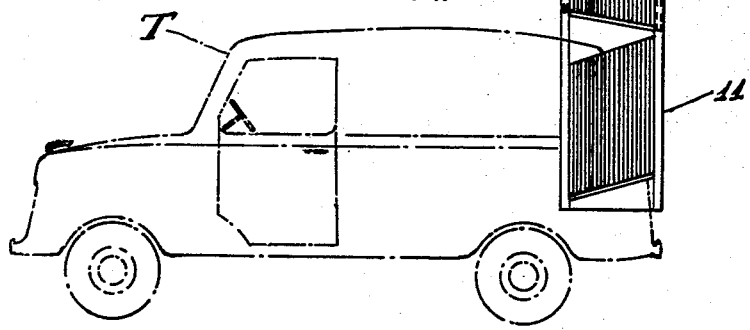
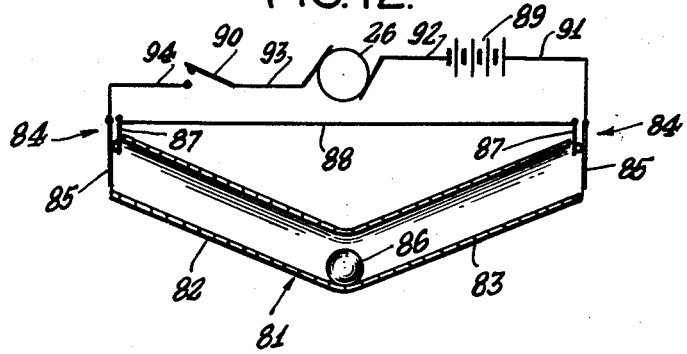
INVENTOR.
MARVIN STEINMAN
BY
J. B. Felshin
ATTORNEY.

United States Patent Office 2,957,259
Patented Oct. 25, 1960

2,957,259

CYCLICALLY CHANGEABLE DISPLAY DEVICE

Marvin Steinman, 200 Newport St., Brooklyn 12, N.Y.

Filed Apr. 10, 1958, Ser. No. 727,687

11 Claims. (Cl. 40—36)

My invention relates to sign display devices and is directed particularly to a display device having a plurality of display panels and including mechanisms for automatically cyclically moving the panels into viewing position.

The principal object of my invention is to provide a display device of the character described wherein a plurality of flat display panels, which may depict advertising material, for example, are moved cyclically from a position in which they are not visible, to a position wherein they are visible for a predetermined period of time.

Another object of the invention is to provide a display device of the above nature wherein each display panel is provided with front and rear display material, and wherein both the front and rear display material are periodically moved into visible position.

A more particular object of the invention is to provide a display device of the character described which is particularly well suited for portable use, such as by being mounted on a truck, and wherein the panels are individually moved from a lower position in which they are not visible to an upper position in which they are visible, and then returned from the upper position to the lower position. The panels may be viewed in both upper and lower positions, from the front as well as from the rear.

Still another object is to provide a display device of the above nature including automatic means for discontinuing operation of the periodical changing mechanism for any period during which a vehicle on which the device is carried is at a greater than predetermined inclination with respect to the horizontal.

Another object is to provide a display device of the above nature wherein the display signs in the individual panels may readily be exchanged with different signs.

Other objects, features and advantages of the invention will be apparent from the following description when read with reference to the accompanying drawings wherein:

Fig. 1 is a side elevational view of a display device embodying the invention;

Fig. 2 is a partial front elevational view thereof taken along the line 2—2 of Fig. 1 in the direction of the arrows;

Fig. 3 is a partial rear elevational view thereof, taken along the line 3—3 of Fig. 1 in the direction of the arrows;

Fig. 9 is a perspective view of a lower corner of one of the display panel frames;

Fig. 10 is a vertical cross-sectional view taken along the line 10—10 of Fig. 9 in the direction of the arrows;

Fig. 11 is a side view of a display device according to the invention installed in the back end of a truck for mobile display, and Fig. 12 is a schematic diagram of the device for temporarily discontinuing automatic operation of the sign display device when the vehicle on which it may be installed is moving over an area having greater than a maximum predetermined angle of inclination.

Figure 4:
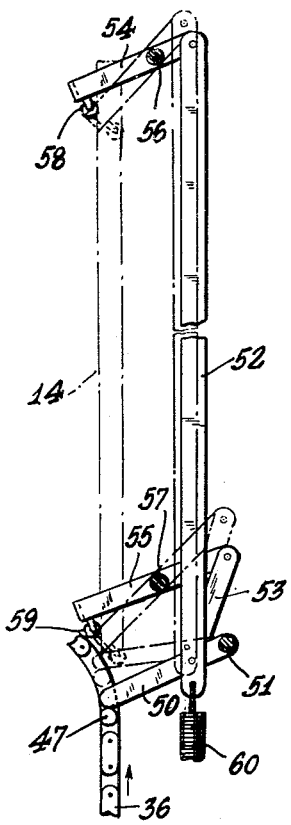
Fig. 4 is a side elevational view of the mechanism for moving the upper display panels rearwardly, shown in two positions of operation.

Referring now in detail to the drawings, wherein like reference numerals denote corresponding parts throughout the several views, the numeral 10 designates generally the display device embodying the invention, the same comprising a generally rectangular housing 11, which may, for instance, be attached to the rear end of a truck T as illustrated in Fig. 11 for mobile display. The housing 11 is provided at its upper end with front and back glass panels 12, 13, respectively (see Fig. 11), through which the display matter on the front and back of individual ones of a plurality of display panels 14 may be viewed.

Each panel 14 comprises a rectangular frame formed of upper and lower channel members 15 preferably formed of sheet metal with longitudinal grooves 16, and side members 17 each comprising a central metal upright member 18 flanked by front and back members 19, of a composition material such as Masonite. The thickness of the side member 17 is greater than the thickness of the upper and lower channel members 15 of the panel frame so that the panels 14 may slide in face-to-face relation to each other without interference with the individual display sheets 20 (Figs. 2 and 3), which may be of paper or cloth, for example, and which are replaceably secured along their upper and lower edges in the grooves 16 in the upper and lower channel members 15 of the panel frame by means of jam rods 21 (see Fig. 10). Secured to each end of the lower frame channel member 15 of each of the panels 14 is a bracket 22 which journals a wheel 23 underneath the panel.

As can best be seen in Fig. 1 (see also Fig. 11), the display device comprises in flat upper platform 24, inclined downwardly from front to back, and a flat lower platform 25, inclined upwardly from front to back, fixed within the housing 11 (housing not shown in Fig. 1). The display panels 14 are stacked upright in face-to-face relation upon the upper and lower platforms 24 and 25, and ride on their rollers 23 so that after the rearmost display panel 14 of the upper stack is moved downwardly into the rearmost position of the lower stack of panels, by mechanism hereinbelow described, the remaining panels of the upper stack will roll downwardly and rearwardly until the rearmost space thus vacated is taken by the next following panel of the upper stack, and so that after the forwardmost display panel 14 of the lower stack is moved upwardly into the forwardmost position of the upper stack of panels, by mechanism to be described, the remaining panels of the lower stack will roll downwardly and frontwardly to replace the forwardmost space then vacated.

The motivating means for periodically moving the forward end panels up and the rear panels down in the above manner described, comprises an electric motor 26 (Fig. 8) having a rotary sprocket 27 engaged with a sprocket chain 28 connecting between two sprocket wheels 29, 30, fixed at the ends of horizontally spaced drive shafts 31, 32 transversely journalled between the sides of the housing 11, at front and rear central positions, respectively, with respect to the upper and lower stacks of panels 14 (see Fig. 1). The front shaft 31 has secured thereto a pair of spaced sprocket wheels 33, 34 entrained by chains 35, 36 extending downwardly and coupled respectively with sprocket wheels 37, 38 spaced on a lower shaft 39 journalled between the sides of the housing 11. The rear shaft 32 has secured thereto a pair of spaced sprocket wheels 40, 41 entrained by chains 42, 43 extending upwardly and coupled respectively with sprocket wheels 43a, 44, spaced on an upper shaft 45 journalled between the sides of the housing 11.

Figure 8:
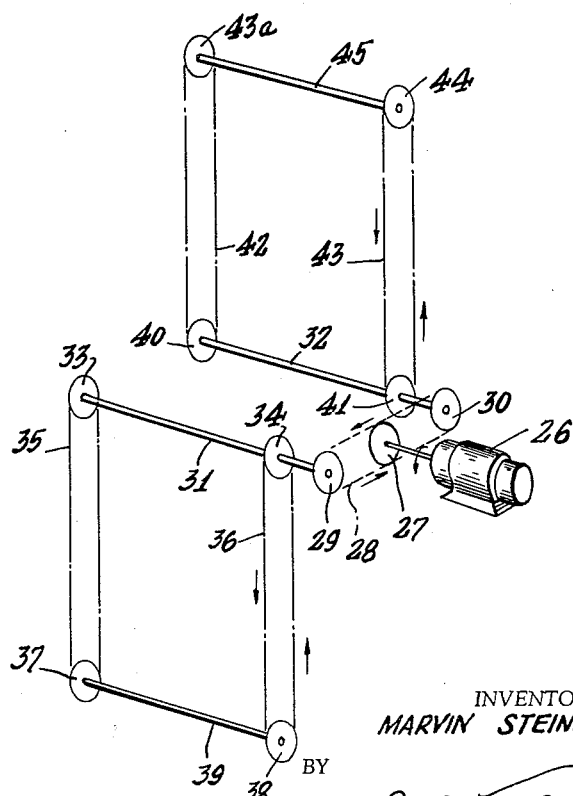
Fig. 8 is a schematic view showing the chain mechanism for cyclically moving the panels up and down to and from their upper positions.

Each of the lower front sprocket chains 35, 36 carries an inwardly projecting rectangular lug 46, in register with each other, and an outwardly projecting pin 47, in register with each other, said pins and lugs being at spaced distances respectively along the chains. Each of the upper rear sprocket chains 42, 43 carries an inwardly projecting rectangular lug 48, in register with each other, and outwardly projecting pin 49 in register with each other and spaced along their respective chains with respect to said lugs. The sprocket chains 35, 36 and 42, 43 will be moved by the electric motor 26 in the direction of the arrows as shown in Figs. 1 and 8.

Referring to Figs. 1 and 4, it will be seen that as the chain 36 moves, its pin 47 will be moved upwardly against a lever 50, rotating said lever about its pivot pin 51 fixed with respect to the frame 11. Mediately linked to the lever 50 is a vertical link member 52 extending upwardly along the length of the panels 14 in the upper stack, and a short link member 53 inclined slightly to the rear. The upper ends of the link members 52, 53 are linked, respectively, to the ends of lever members 54, 55, mediately journalled with respect to the frame 11 as at pivots 56, 57. The outer ends of the lever members 54, 55 carry push rollers 58, 59 adapted to abut along the front of the side members 17 of the panel frame. A tension spring 60 connected between the lower end of the vertical link member 52 and the frame 11 normally holds said link member in its lowermost position, as shown by the full line representation thereof in Fig. 4. Upward movement of the pin 47 upon movement of the chains, however, causes upward movement of the link members 52, 53, whereupon the rollers 58, 59 will be moved inwardly, as illustrated by the broken line representation of the mechanism shown in Fig. 4, to push the upper panel stack rearwardly and allow space for the next following operation of moving the frontmost display panel 14 of the lower stack upwardly. As the chains 35, 36 continue to move, their lugs 46 engage under the lower ends of the foremost lower display panel 14 and proceed to lift it into the space just vacated by the above-described pushing mechanism. As the front panel moves upwardly, its top edge contacts a pair of spaced rocker plates 61 (only one shown in Figs. 1, 2 and 7) each of which is swingably mounted at its lower end about a shaft 62 extending between the sides of the housing 11 at the forward upper end of the lower stack of display panels 14. Each rocker plate 61 has a flat back portion 63 inclined upwardly and to the rear and normally resting at its upper end against the front edge of the upper platform 24, and a flat forwardly-extending right angular portion 64. The upper end of each of the rocker plates 61 is provided with a rectangular cut-out 65 to allow free passage of the rollers 23 at the lower ends of the display panels 14, while the right angular portions 64 thereof serve as supports for the frontmost panel of the upper stack of panels, as can best be seen in Fig. 7. In this connection it is to be noted that the upper platform does not project forwardly enough to support the frontmost display panel, so as to allow the vertical upward movement of the frontmost panel of the lower stack into upper position.

Figure 7:
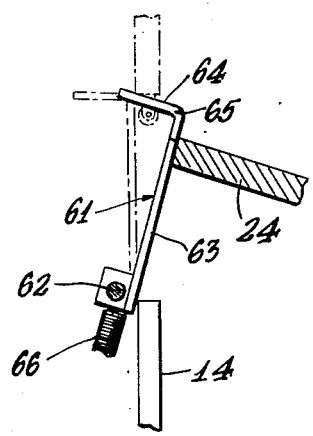
Fig. 7 is a side elevational view of the mechanism for supporting from underneath the frontmost of the upper panels, shown in two positions of operation.

As the frontmost display panel of the lower stack is moved upwardly by action of the lugs 46 on the sprocket chains 35, 36, as described above, the upper forward edge of said panel will slide against the back portion 63 of the rocker plates 61 and turn them counterclockwisely against the resiliency of the tension springs 66 secured between the lower ends of said rocker plates and the housing 11, as illustrated by the broken line position representation of said rocker plates in Fig. 7. When the panel is lifted to its uppermost position, the rocker plates will swing back against the platform 24 again, and support the panel from underneath until it is pushed rearwardly onto said platform by action of the push rollers 58, 59 in the manner described above. Leaf springs 67 attached to the sides of the housing 11 and bearing against the sides of the frontmost display panel 14 serve the purpose of preventing backsliding of the upper stack of panels after return of rollers 58, 59 into normal or rest position.

Figure 5:
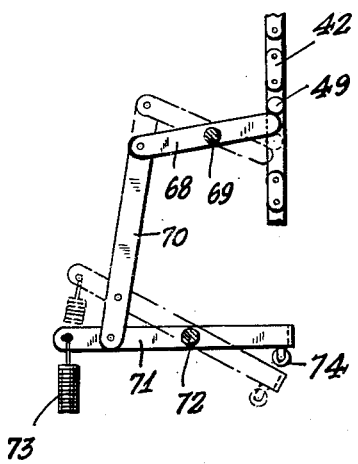
Fig. 5 is a side elevational view of the mechanism for moving the lower display panels forwardly, shown in two positions of operation.

After the frontmost display panel 14 of the lower stack is moved into upper position, as described above, and before this cycle of operation is repeated, the rearmost one of the display panels in the upper stack will be pushed downwardly into rearmost position of the lower stack. To this end, mechanism is provided for sequentially pushing the lower stack forward to provide space, in case the lower stack has not rolled forwardly by itself, at the rear end of the lower stack, and for releasing and pushing down the rearmost panel of the upper stack into said space. Movement of the sprocket chains 42 and 43 in the direction indicated in Figs. 1 and 8 causes the pins 49 to abut, at each side of the device, one end of a lever 68 (see Figs. 1, 5) mediately pivoted by a pin 69 fixed with respect to the housing 11. The other end of each of the levers 68 is pivoted to one end of a link 70, the other end of which is pivoted near one end of a lever 71 mediately fulcrumed about a pin 72 fixed with respect to the housing 11. The forwardmost end of each lever 71 is normally constrained in the downward direction by means of a tension spring 73 anchored to the housing 11 or by weight of bar 70. The rearmost end of each lever 71 carries a push roller 74 normally adapted to rest against the upper side portions of the frame of the rearmost of the lower display panels 14. Continued downward movement of the sprocket pins 49 (see Fig. 5) causes counterclockwise rotation of the levers 68 and 71 against the return force of the springs 73, thereby moving the push rollers 74 inwardly (as shown by the broken line representation of the mechanism in Fig. 5) to force the lowermost stack of display panels forwardly. Leaf springs 75 fixed against the sides of the housing 11 serve the dual purpose of slowing down the downward movement of the rearmost of the upper display panels 14, next to be described, and preventing (by contacting against the forward edges of said springs) subsequent backslidings of the lower stack of panels after return of the push rollers 74 into normal or rest position.

Figure 6:
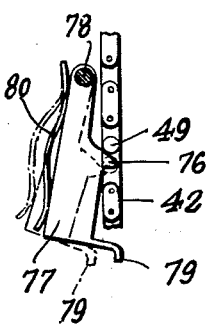
Fig. 6 is a side elevational view of the mechanism for allowing downward movement of the rearmost of the upper panels, shown in two positions of operation.

The pins 49 on the sprocket chains 42, 43 will next come into abutment with the cam projection members 76 of a pair of support rocker members 77 pivoted at their upper ends with respect to the housing 11 as by pins 78. The rocker members 77 are provided at their lower ends with rearwardly projection support members 79 normally disposed underneath the lower end of the rearmost one of the display panels 14 in the upper stack, outwardly of the rollers 23. A leaf spring 80 normally constrains each rocker member 77 in the rearmost position illustrated in Fig. 3 and in the full line representation thereof in Fig. 6. Upon further downward movement of the sprocket chain pins 49, the rocker members 77 will be turned clockwisely so that the projecting support members 79 thereof will be moved away from under the rearmost one of the display panels 14 in the upper stack and allow it to fall, past the foreshortened end of the upper platform 24 and into the position at the rear end of the lower stack of panels in the space just previously vacated as described above. The leaf springs 75, as described above, will slow down the downward falling motion of the panel as it moves into the lower position. The lugs 48 on the sprocket chains 42, 43 engage the upper end of the rearmost panel in the upper group as soon as the rocker members 77 are clear of said panel to push the panel downwardly, rocker members 77 being spring pressed against the panel, slowing it down and resisting fast drive of the panel.

After a period of time depending upon the speed of the drive motor 26, during which the display material on the front of the frontmost panel 14 and on the back of the rearmost panel 14 of the panels in the upper stack will be visible through the glass panels 12 and 13, respectively, on the housing 11 (see Fig. 11), the above described sequence of operations will be repeated so that the display material on the fronts and backs of all the display panels 14 will be shown in order through said glass panels.

As illustrated in Fig. 12, switch means is provided for discontinuing automatic operation of the display device if a vehicle on which it is being carried is at a greater inclination than a predetermined given inclination with respect to the horizontal. To this end, a tube 81 is provided, having similar upwardly-extending arms 82, 83 said tube being secured longitudinally in the vehicle. A normally closed switch 84 is arranged at the open end of each of the tube arms 82, 83, said switches having movable contact arms 85 extending over said open ends. A heavy ball 86 is provided within the tube 81, said ball normally being disposed in the lowermost central position within said tube. The fixed contact arms 87 of the switches 84 are interjoined by a contactor 88. The movable contact arms 85 of the switches 84 are connected in series with a battery 89, which may be the vehicle battery, the drive motor 26 for the display device, and an on-off switch 90 through wires 91, 92, 93, and 94. When the switch 90 is closed, energization current will normally be supplied from the battery 89 to the motor 26 through the switches 84. If the vehicle should pass through a zone having an inclination with the horizontal, either upwardly or downwardly, greater than the angle of the arms 82, 83 of the tube 81, the ball 86 will roll outwardly to contact one or the other of the movable contact arms 85, moving it away from contact with its fixed contact arm 87, thereby breaking contact with the energization circuit to the motor 26 and stopping automatic operation of the display device for the period during which the vehicle travels at such inclination. Battery 89 indicates any current source.

Though only one form in which the invention may conveniently be embodied in practice is described in this specification, it is to be understood that this form is given by way of illustration only, and that the invention is not limited to the particular disclosure, but may be modified and embodied in various other equivalent forms without departing from its spirit. In short, the invention includes all the modifications and embodiments coming within the scope of the following claims.

The rectangular frames for the panels 14 may be formed with longitudinal grooves at the side member 17 as well as top and bottom members so that the panels may be secured by means of jam rods at the top, bottom and sides. It will be further observed that the lugs 46 raise the front panels. As these lugs 46 move upwardly they will swing the rocker plate 61 from fully lined position of Fig. 7 to the dot-dash position of said figure. When the front panel is fully raised, these lugs 46 will be in registry with the cutouts 65 of the rocker plate 61, thereby permitting the rocker plate to swing back from the dot-dash position of Fig. 7 to the fully lined position of Fig. 7 while the front panel is still being supported by said lugs. As the roller plates swing back to inclined position the lugs 46 will pass through the cutouts 65.

It will be further observed that the device, instead of being mounted on a truck, may be mounted in any suitable position and that the outermost panels in the lower group may be seen through suitable windows at both front and rear.

Having thus fully described my invention, what is claimed as new and for which it is desired to obtain Letters Patent is:

1. In a display apparatus, the combination comprising a plurality of display panels, mounted in two groups one above the other, the panels of each group being in face-to-face upright stacked disposition, a first cyclically operative means for moving the display panel at one end of said lower group upwardly in stacked position at one end of said upper group of panels, said first cyclically operative means including a sprocket chain and means thereon to engage the underside of said end display panel, and a second cyclically operative means following said first moving means for moving the display panel at the other end of said upper group downwardly into stacked position at the other end of said lower group of panels, said cyclically operative means including a second sprocket chain and means thereon to engage the upper end of the display panel at the other end of the upper group, and a common means for moving both sprocket chains simultaneously.

2. The display apparatus as defined in claim 1 in combination with an upper platform inclined in one direction disposed below of said upper stack and upon which said upper stack panels are guided, and a lower platform inclined in the opposite direction disposed below of said lower stack and upon which said lower stack panels are guided.

3. The combination as defined in claim 2, including a pair of rollers arranged along the lower edge of each of said panels for roller motion along said platforms.

4. The combination of claim 1 in combination with withdrawable support means at the underside of said display panel at the other end of said upper group.

5. The combination of claim 4, including means for retarding the downward motion of said last-mentioned panel.

6. The apparatus according to claim 5 wherein said last means comprises a plurality of springs arranged to frictionally engage the longitudinal edges of said last-mentioned panel as it falls.

7. In a display apparatus, the combination comprising a plurality of display panels, mounted in two groups one above the other, the panels of each group being in face-to-face upright stacked disposition, a first cyclically operative means for moving the display panel at one end of said lower group upwardly in stacked position at one end of said upper group of panels, a second cyclically operative means following said first moving means for moving the display panel at the other end of said upper group downwardly into stacked position at the other end of said lower group of panels, a housing surrounding said upper and lower panel groups, said housing having a window in register with the outer face of one of the panels at the ends of said stacked upper group, said first and second moving means comprising a first pair of sprocket chain loops vertically arranged in transversely-spaced relation in front of the display panel at said one end of said lower stack, a second pair of sprocket chain loops vertically arranged in transversely spaced relation in front of the display panel at said other end of said stacked group of upper display panels, and drive means cooperatively intermeshed with said first and second pair of sprocket chain loops for driving said loops so that the inner strand of said first pair of chain loops moves upwardly, and so that the inner strand of said second pair of chain loops moves downwardly.

8. The apparatus according to claim 7 wherein said drive means includes an electric motor, and circuit means for energizing said motor.

9. Display apparatus comprising a lower group of vertical panels, means to support said group, an upper group of vertical panels, means to support the upper group of panels above the lower group, means to move the front panel of the lower group upwardly against the front of the upper group of panels and means to move the rear panel of the upper group down against the rear of the lower group, in combination with movable actuated means controlled by the means for moving the front panel upwardly, to move the upper group of panels as a whole rearwardly, and movable actuated means controlled by the means for moving the rear panel downwardly, for moving the lower group of panels as a whole forwardly.

10. The combination of claim 9, in combination with means to prevent backsliding of the upper group of panels.

11. The combination of claim 10 in combination with means to prevent backsliding of the lower group of panels.

References Cited in the file of this patent
UNITED STATES PATENTS

| | | |
|---|---|---|
| 1,179,490 | Yaw | Apr. 18, 1916 |
| 1,458,227 | Freemon et al. | June 12, 1923 |
| 1,540,661 | St. Clair et al. | June 2, 1925 |
| 1,540,830 | Davis | June 9, 1925 |
| 1,555,057 | Hinchey | Sept. 29, 1925 |
| 2,099,142 | Roberts | Nov. 16, 1937 |
| 2,102,798 | Jerabek | Dec. 21, 1937 |
| 2,131,168 | Eitzen | Sept. 27, 1938 |
| 2,639,525 | Riley et al. | May 26, 1953 |